United States Patent

Heetman

[15] 3,676,599

[45] July 11, 1972

[54] TELECOMMUNICATION DEVICE

[72] Inventor: Alphonsus Heetman, Eindhoven, Netherlands

[73] Assignee: U.S. Philips Corporation, New York, N.Y.

[22] Filed: Jan. 15, 1971

[21] Appl. No.: 106,797

[30] Foreign Application Priority Data

Jan. 23, 1970 Netherlands ..........7000939

[52] U.S. Cl. ..........179/15 BS, 178/69.5

[51] Int. Cl. ..........H04j 3/06

[58] Field of Search ..........179/15 BA, 15 BS, 15 BY; 178/69.5 R

[56] References Cited

UNITED STATES PATENTS

| | | | |
|---|---|---|---|
| 3,504,126 | 3/1970 | Inose | 179/15 BS |
| 3,591,720 | 7/1971 | Othmer | 178/69.5 R |

*Primary Examiner*—Ralph D. Blakeslee
*Attorney*—Frank R. Trifari

[57] ABSTRACT

Telecommunication arrangement for receiving, storing and reading pulsecodemodulated, timemultiplex signals emanating from incoming multichannel transmission systems and received therefrom with varying periodic timescales or reception, which consist of equal channel intervals, in which each incoming multichannel transmission system is connected to a transposition arrangement for transducing the channel information of each incoming time channel into an associated local time channel, which is determined by a local clock and in which each local time channel has associated therewith a storage location for storing the channel informations that are transposed to said local time channel, there being provided an address modification arrangement for modifying the addresses for reading in the storage locations, when as a result of a shift of the time scale of reception, the correspondance that exists between the local time channels and the incoming time channels changes.

1 Claim, 9 Drawing Figures

INVENTOR.
ALPHONSUS HEETMAN

BY
[signature]
AGENT

INVENTOR.
ALPHONSUS HEETMAN
BY
AGENT

INVENTOR.
ALPHONSUS HEETMAN
BY
AGENT

INVENTOR.
ALPHONSUS HEETMAN

BY [signature]
AGENT

INVENTOR.
ALPHONSUS HEETMAN
BY [signature]
AGENT

INVENTOR.
ALPHONSUS HEETMAN
BY Frank R. Trifari
AGENT

TELECOMMUNICATION DEVICE

The invention relates to a telecommunication arrangement for receiving, storing and reading sequences of coded informations. Devices of the class described are conventionally provided with a storage arrangement, an addressing arrangement for writing in the storage arrangement, an addressing arrangement for reading in the storage arrangement, and a receiving arrangement for receiving a sequence of coded informations the time scale of reception of which is formed by equal receiving intervals. A local clock arrangement is provided with a generator for generating a local time scale that consists of equal local intervals having the same nominal duration as the receiving intervals, and a transposition arrangement provides for transforming each received coded information, from the receiving interval into an associated interval of a transformed time scale that consists of normal intervals each coinciding with a local interval, shortened intervals of zero length and prolonged intervals each coinciding with two consecutive local intervals. The foregoing said intervals of the transformed time scale are associated one to one to the receiving intervals. The storage arrangement includes an input arrangement for storing in each local interval the received coded information that is transposed to said each local interval in the sector of the storage arrangement that is associated with the said transposition arrangement that is in the storage location thereof that is indicated in said each local interval by the addressing arrangement for writing.

In known arrangements of this kind each interval of the transformed time scale has associated therewith a number corresponding to the channel number of the received coded information, that is transposed to said interval. These channel numbers are used for identifying in each local interval in which a coded information is written in the corresponding sector of the storage arrangement a storage location in this sector. In these arrangements a separate addressing arrangement for writing is required for each transposition arrangement and if all sectors of the store are written in parallel, a separate address decoding arrangement for writing is also required for each transposition arrangement. An arrangement of the latter kind is known from the British Patent specification No. 960,511.

The invention has for its object to provide a new concept of the telecommunication arrangement of the kind set forth.

The telecommunication arrangement according to the invention is characterized in that, the addressing arrangement for writing is formed by a cyclic address counter which generates an address in each local interval, in that a signalling device is provided for signalling the following signalling states:

1. the transformed time scale of the transposition arrangement comprises a shortened interval; and 2. the transformed time scale of the transposition arrangement comprises a prolonged interval. An address modification arrangement is provided for reducing, in the signalling state 1, and for raising, in the signalling state 2, by unity, the addresses of the storage locations of the sector of the storage arrangement that is associated with the transposition arrangement, that are stored in the addressing arrangement for reading.

This telecommunication arrangement has the advantage that one addressing arrangement for writing in all sectors of the store can be used and that a single address decoding arrangement for writing can be used for all sectors of the storage arrangement.

The invention and its advantages will be described more fully with reference to the following Figures.

Figure 1:
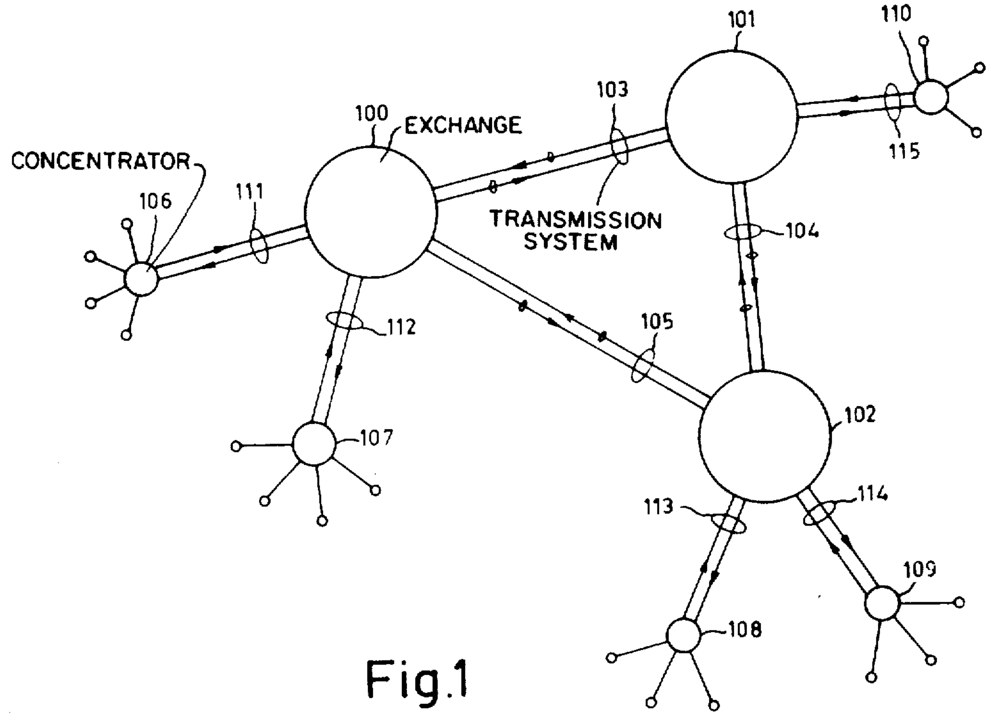
FIG. 1 shows a telecommunication network.
Figure 2:
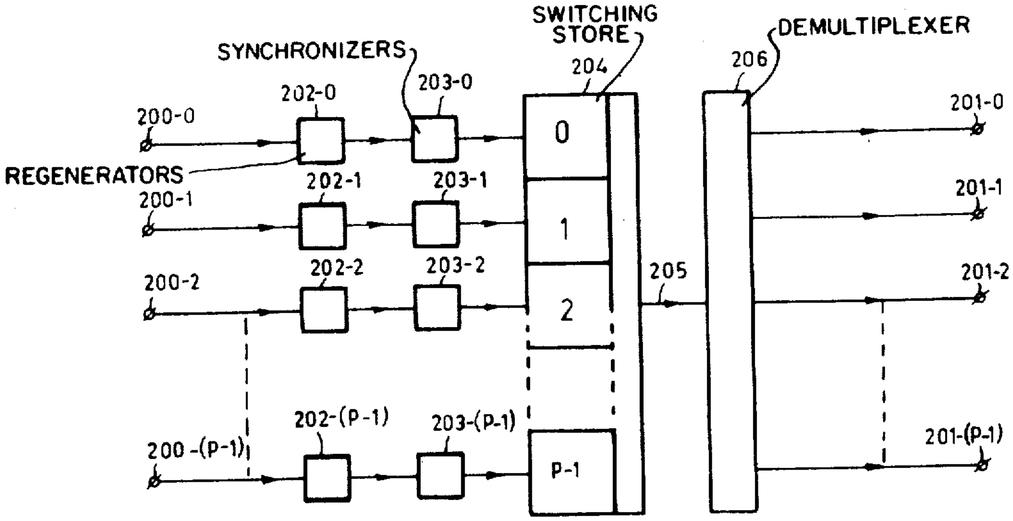
FIG. 2 shows a diagram of a transit exchange.

The specification is split up into two portions, a general part with reference to FIGS. 1 and 2, and a detailed part with reference to FIGS. 3 to 8. For the latter part it is advantageous to arrange FIGS. 5 to 8 in the manner illustrated in FIG. 9.

GENERAL DESCRIPTION

FIG. 1 shows a simple telecommunication network including transit exchanges and concentrators. It comprises the transit exchanges 100, 101 and 102, which are connected to each other by means of two-directional multi-channel transmission systems 103, 104 and 105. To these transit exchanges are connected the concentrators 106, 107, 108, 109 and 110 via the separate two-directional multi-channel transmission systems 111, 112, 113, 114 and 115. To the concentrators are connected groups of subscriber lines.

As is shown in FIG. 1, the two transmission directions of the transmission systems are separated. The two transmission directions may employ different core pairs in one cable or different carrier frequencies of directional radiowaves. The two transmission directions start and terminate at lines termed multiplex lines. In a transit exchange or a concentrator a line carrying off signals is termed an outgoing line and a line supplying signals is termed an incoming line. The connection of a two-directional multi-channel transmission system with separate transmission directions to an exchange or a concentrator is then formed by an incoming and an outgoing multiplex line. The signal carried by a multi-plex line is termed a multiplex signal.

Although the form of the telecommunication network of FIG. 1 is not typical for the application of the principle of the formation of multiplex signals by time division, it is this principle which is applied here. This principle will hereinafter be termed the time-multiplex principle.

In the application of the timemultiplex principle time is divided into equal scanning periods, termed frames. Each frame is divided into $n$ equal channel intervals $t_0, t_1, \ldots t_{n-1}$. By associating a transmission medium common to a plurality of sources to a source during a channel interval having the same number in each frame an equidistant succession of samples of the signal of the source can be applied to the transmission medium and be transmitted thereover. The succession of channel intervals having the same number in each frame is termed a time channel. Through such a time channel signals having a maximum frequency equal to half the scanning frequency can be transmitted without distortion.

In the application of the pulsecodemodulation principle (PCM) the amplitude range of the signal is divided into a finite number of quantifying levels and the quantifying level nearest the signal value is coded in a code having a plurality of binary elements and transmitted in the form of a pulsecodegroup. In the combined application of pulsecodemodulation and timemultiplex each channel interval is divided into $m$ equal bitintervals $b_o, b_1, \ldots b_{m-1}$. Each bitinterval can accommodate one bit, whose values 0 and 1 may be represented by the absence and the presence respectively of a pulse in the bitinterval. Each channelinterval can hold a codeword of $m$ bits. These codewords may represent coded signalvalues of analogue signals such as speech signals or may represent data.

In timemultiplex transmission systems with pulsecodemodulation and beenched synchronisation one of the time channels is employed for the transmission of fixed information for the purpose of framesynchronisation. Hereinafter a timemultiplex PCM-system having the following characteristics will be taken as a basis:

Number of channels $n = 32$

Number of bits per code word $m = 8$.

Frame: 125 $\mu$usec

Scanning frequency: 8,000 Hz.

Framesynchronisation in the timechannel 31 ($t_{31}$).

In the transit exchanges of the telecommunication network as shown in FIG. 1 connections are established selectively between the channels of the timemultiplex lines connected thereto. When the timemultiplex principle is applied in the transit exchanges these connections between the channels, hereinafter termed connection channels, are divided in time or in time and space. The part of an exchange in which the connection channels are established is referred to as the switching network. The switching network of a timemultiplex and pulsecode-modulation exchange is usually formed by switching stores, internal timemultiplex lines and/or internal supertimemultiplex lines in one or more stages and switching network having crosspoints distributed in space.

A telecommunication network using time multiplex and pulsecodemodulation in the transmission systems and in the exchanges is termed an integrated network.

FIG. 2 shows a diagram of the part of a transit exchange for use in an integrated network for the transmission of channel informations from the timechannels of the incoming timemultiplex lines 200-0, 200-1, . . . . 200-($p$-1) to the timechannels of the outgoing time multiplex lines 201-0, 202-1, 201-2, . . . 201-($p$-1). Herein each pair of multiplex lines 200-$i$ and 201-$i$ ($i$ = 0, 1, 2 . . . . ($p$-1)) may form the connecting lines of the same two-directional time multiplex transmission system.

The incoming time multiplex lines 200-0, 200-1, 200-2, . . . 200-($p$-1) are connected to the regenerators 202-0 202-1, 202-2, . . . 202-($p$-1). Each of these regenerators regenerates from the sequence of bits received from the incoming time multiplex line a clock signal of the bitfrequency and regenerates with the aid of this clock signal the bits of the incoming bit sequence.

In the integrated networks of the type termed "asynchronous" each exchange has its own clock. This clock determines the instants at which the bits are transmitted through the outgoing timemultiplex lines. The clock signal derived by a regenerator 202— from the incoming bit sequence determines the instants at which the bits of the incoming time multiplex line are received. This regenerated clock signal is synchronous to the clock of the exchange which transmits the bit sequence. The latter exchange is termed the distant exchange and the clock thereof is termed the distant clock. The clock of the exchange under consideration is termed the local clock.

Concentrators are usually driven in a master-slave relationship with respect to the exchange to which the concentrator is connected. The clock of the concentrator is synchronized to the clock of the exchange.

Due to difference in speed between the distant clock and the local clock and/or due to transittime variations along the transmission path the regenerated bit-sequence shifts relatively to the local clock. When the bitspeed of the regenerated bitsequence exceeds the local bitspeed, which is determined by the local clock, more bits are received than the exchange can process. On the other hand, when the bitspeed of the regenerated bitsequence is lower than the local bitspeed, fewer bits are received than the exchange is capable of processing. In order to match these different speeds to each other synchronizers 203-0, 203-1, 203-2, . . . 203-($p$-1)- are used, in which the regenerated bits are temporarily stored. In each synchronizer a supply of bits is formed, from which the exchange can read bits c.q. code words. In the synchronizers the codewords are connected from the serial-form into the parallelform. The exchange reads these code words one at a time.

Normally the exchange reads the codewords at the local wordrate from the synchronizers. A readinterval for reading a codeword then equals a local channel interval. The matching to the rate of reception of the code-words may be accomplished by prolonging or shortening from time to time the interval in which a codeword is read, by an integral number of bitintervals. If the latter number is indicated by $x$, a prolonged readinterval comprises $(m + x)$ bitintervals and a shortened read-interval comprises $(m - x)$ bitintervals. It will be assumed that $x$ is equal to or lower than $m$.

If the bit rate of the received bitsequence exceeds the local bitrate, shortened readintervals with $(m - x)$ bitintervals are used for the respective synchronizer from time to time. In the other case prolonged intervals with $(m + x)$ bitintervals are inserted from time to time.

The codewords are read from the synchronizers in the same order as they are received. In the reaching process an arrangement determining the order of succession is operative, which arrangement is advanced one step each time a codeword is read. In practice $x$ is chosen in many cases to be equal to $m$. In this case a prolonged read interval comprises two channel intervals. The arrangement determining the order of succession than performs one step after two channel intervals so that in the case of non-destructive readout the same codeword is read in two successive channelintervals. A shortened read interval comprises, if $x = m$, zero bitintervals. The arrangement determining the order of succession than performs an additional step between two normal readintervals, whereby one codeword is skipped.

The switchingnetwork of the transitexchange shown in FIG. 2 comprises a switching store 204, a supertimemultiplex line 205 and a demultiplexer 206.

The switchingstore 204 comprises the sectors 204-0, 204-2, 204-2, . . . 204-($p$-1), each having a storage capacity of 32 codewords of 8 bits. To the incoming multiplexline 200-$i$ ($i$ = 0, 1, 2, . . . ($p$-1)) is joined the sector 204-$i$ of the switchingstore. In each sector the codewords from an incoming timemultiplexline are stored temporarily and at the most for the duration of one frame.

Each channelinterval of the local clock is divided into ($p$ + 1) equal subintervals $s_o$, $s_1$, 2 . . . $s_p$. The subinterval $s_p$ is used for writing the received code-words in the switchingstore. The subintervals $s_o$, $s_1$, . . . $s_{p-1}$ are used for reading codewords in selected locations of the switchingstore and for transferring them to the supertimemultiplexline 205.

The demultiplexer 206 distributes the sequence of codewords that is received from the supertimemultiplexline 205 in a cyclic manner, with a period equal to a channel interval, over the $p$ outgoing timemultiplexlines 201-0, 201-1, 201-2, . . . 201-($p$-1). Herewith to each outgoing timemultiplexline there is associated a separate subinterval for receiving a codeword from the supertimemultiplexline 205. For example, to the outgoing timemultiplexline 201-$j$ ($j$=0, 1, 2, . . . ($p$-1) is associated the subinterval $s_j$. In the following description a switchingstore 204 is considered comprising 15 sectors, which means that $p$=15.

In the demultiplexer 206 the codewords are converted from the parallelform to the serialform by parallel-serial converters individually joined to the outgoing timemultiplexlines. The codewords are subsequently transmitted in local channelintervals over the outgoing timemultiplexlines.

The transmission of the coded information from a timechannel of an incoming timemultiplexline to a time-channel of an outgoing timemultiplexline comprises the following steps, which have to be repeated in each frame:

a. Storage in the subinterval $s_{15}$ of the received codeword at the storage location associated with the incoming timechannel in the sector of the switching store 204 associated with the incoming timemultiplexline.

b. Reading of the codeword from the storage location referred to under a) in one of the subintervals $s_o$, $s_1$, . . . $s_{14}$ of one of the channelintervals $t_o$, $t_1$, . . . $t_{31}$.

c. Transmission of the codeword read as indicated under (b) to the outgoing multiplexline to which is associated the subinterval used under (b).

d. Transmission of the codeword supplied as indicated under (c) in the channelinterval following the channel-interval used under (b).

When a codeword appears at the output of a clock-controlled circuit for example the demultiplexer, in the channel interval $t_j$ after having been applied to the input thereof in the channel interval $t_{j-y}$, with $j$ = 0, 1, . . . 31, in which $y$ is a constant of the circuit which may have one of the values 0, 1, 2, . .

. , then at the input of the circuit there are defined the channel intervals $t_j^*$ by $t_j^* = t_{j-y}$. The value of $y$ has to be determined separately for each circuit. The reference position with $y=0$ is the position of the outgoing time multiplex lines. At the supertimemultiplexline $y = 1$. The advantage of the use of the notation $t^*$ for the description is that independently of the time lag the numbers of the channelintervals $t^*$ in all sections of a connecting channel are the same. (In the foregoing $j$-$y$ means a difference modulo 32).

To each incoming timemultiplexline there is permanently associated a sector of the switchingstore. The associating a storage location of the sector to an incoming timechannel then only requires address information, which determines the storage location within the sector. With respect to writing of codewords the sectors of the switchingstore behave like independent stores. In fact the principles to be described hereinafter may also be carried into effect in exchanges having a separate switchingstore for each incoming timemultiplexline.

The method generally employed for associating a storage location to an incoming channel consists in using the channelnumber of the incoming timechannel as the address information. With this method the storage location 0 is associated with channel 0, the storage location 1 to channel 1, etc.

The frames of the various incoming multiplexlines are generally not in phase with each other. When the channelnumbers are used as an address information they have to be separately generated for each incoming timemultiplexline and each sector of the switchingstore requires a separate address decoder. For economizing equipment it is advantageous to have for all sectors of the switchingstore a common addressing arrangement and a common address decoder for writing.

According to the invention a cyclic addressing method is employed for writing. The addresses are generated by a cyclic addresscounter, which is controlled by the local clock. In each local channelinterval this addresscounter supplies one address. This address determines a storage location in each sector of the switchingstore, where a codeword can be written.

A codeword read from a synchronizer lies in a readinterval of $m$ bitintervals or in a readinterval of $(m+x)$ bitintervals or in a readinterval of $(m+x)$ bitintervals. If $x=m$, each readinterval of $m$ bitintervals coincides with a local channel interval and each read interval of $(m+x)=2m$ bitintervals coincides with the two consecutive channelintervals and the readinterval of $(m-x)$ bitintervals is equal to zero. In each local channelinterval just one codeword is read from the synchronizer. This codeword emanates from an incoming timechannel having a definite channelnumber. The cyclic addresscounter generates a given address in the local channelinterval in which the code word is read from the synchronizer. This address is termed the local channelnumber of the incoming timechannel.

If $x \neq m$, a local channelinterval may coincide in part with two consecutive readintervals. In one local channelinterval the cyclic address counter provides one address. In each channel interval one codeword has to be selected at the output of the synchronizer. It may occur with this selection that a codeword with a readinterval of $(m-x)$ bit intervals is skipped and a code word with a readinterval of $(m+x)$ bit intervals is selected in two successive channelintervals,. When the intervals in which the selected codewords are located are termed selectionintervals, it may be said that a received codeword lies in a selectioninterval which coincides with a local channelinterval or which coincides with two successive local channelintervals or which is equal to zero. If $x=m$, the selection intervals are the same as the readintervals. Hereinafter it will be supposed that $x=m$. The case $x \neq m$ may be simply inferred from the case $x=m$ by substituting in the latter case selectionintervals for readintervals.

For carrying out step $b$ of the transmission process an addressing arrangement for reading (not shown in FIG. 2) is used, which can supply the address of an arbitrarily selected storagelocation in each subinterval of the local frame. The adress to be supplied for a given incoming timechannel is the address of the storagelocation where the codewords received from the incoming timechannel are stored. In the known method of writing this address is the channelnumber of the incoming timechannel. In the method in accordance with the invention this is the local channelnumber of the incoming timechannel.

The local channelnumber of an incoming timechannel is a constant as long as in reading in the synchronizer no shortened or prolonged readintervals are introduced in order to compensate for differences in clock rates and/or transittime variations. When the local channelnumber of an incoming time channel varies as a result of the introduction of a shortened or prolonged readinterval, the local channelnumber stored in the addressing arrangement for reading is varied accordingly. It is thus achieved that the addressing arrangement for reading supplies always the correct addresses for each incoming timechannel to the switching store.

The modification of the local channelnumbers in the addressing arrangement for reading is performed simultaneously for all timechannels of an incoming time multiplexline because the introduction of a shortened or a prolonged read interval affects the local channelnumbers of all channels of the same incoming timemultiplexline. Only one device for modifying the local channelnumbers is needed at for each addressing arrangement for reading and this involves only a slight increase in equipment.

DETAILED DESCRIPTION

The embodiments of the invention employ digital circuits. At the inputs and at the outputs of these circuits two voltage levels are distinguished, which correspond to the logical states 0 and 1. A voltage corresponding to the logical state 0 is termed a 0-signal. A voltage of the other level is termed a 1-signal. It is assumed that a clock pulse brings the voltage of a conductor to a level equal to that of a 1-signal, during the leading edge of the clock pulse and to a level equal to that of a 0-signal during the trailing edge of a clock pulse.

The embodiments are based on a system of clockpulse controlled logical circuits such as registers and counters, the output states of which are varied during the trailing edges of the clockpulses. Setting and resetting inputs respond directly to a change of the inputstate from 0 to 1.

Figure 3:
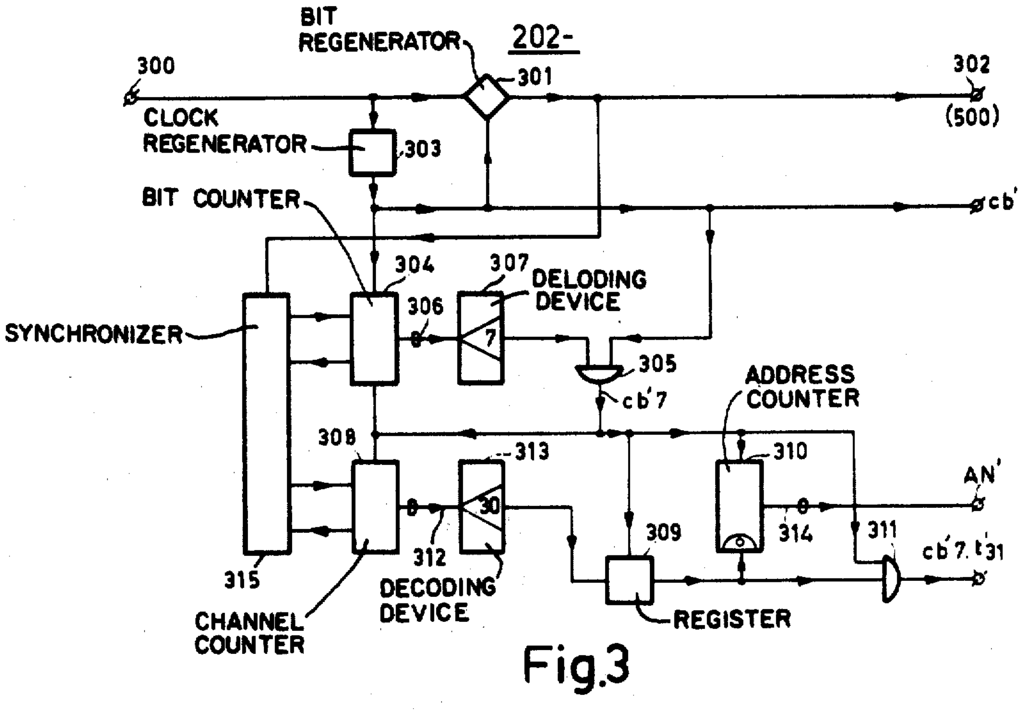
FIG. 3 shows a regenerator for PCM-time multiplex signals.

The regenerator 202- shown in FIG. 3 comprises an input terminal 300 for receiving the sequence of bits from the incoming timemultiplexline 200-. This bit sequence is applied to a bitregenerator 301, with regenerates the bits and applies them to the output terminal 302 in the regenerated bit intervals $b'$.

A clockregenerator 303 derives from the received bitsequence an equidistant sequence of clockpulses $cb'$, which have the same repetition frequency as the bits. The clockpulse sequence $cb'$ divides the time into equal, regenerated bitintervals $b'$. The bitinterval is assumed herein to be the time interval between the trailing edge of the clock pulse $cb'$ and the trailing edge of the next-following clock pulse $cb'$. The clockpulse sequence $cb'$ is applied to the bitregenerator 301, to the clockpulse output $cb'$, to the bitcounter 304 and to the and-gate 305. The bitregenerator 301 adapted its output state to the value of a received bit during the trailing edge of each clockpulse $cb'$ and produces for each bit a 0-signal or a 1-signal having the duration of a regenerated bitinterval $b'$.

The bitcounter 304 is a cyclic modulo-8 pulsecounter. The bitcounter changes its state at the trailing edge of each clock pulse $cb'$, that is to say at the the beginning of each new bit interval $b'$. This counter performs a counting cycle of 8 bit intervals $b'$. In each counting cycle the counter supplies a sequence of 8 binary codewords at the group of codeoutputs 306, which sequence forms the binary equivalent of the sequence of decimal numbers 0, 1, . . . 7. In this way the sequence of regenerated bitintervals $b'$ is divided into cycles of 8 bitintervals, to which 8 bitintervals are associated in the order of appearance the decimal numbers 0 to 7. The bitintervals of one cycle are designed in the order of succession by $b'_0, b'_1, \ldots b'_7$. Each cycle of 8 regenerated bitintervals $b'_0, b'_1, \ldots b'_7$ forms a regenerated channelinterval $t'$. *The clock pulse cb'* lying in the bitinterval $b'_i$ ($i = 0, 1, \ldots 7$) is designated by $cb'_i$.

To the group of codeoutputs 306 of the bitcounter 304 is connected a decoding device 307 of the number 7, which applies in each bitinterval $b'_7$ a 1-signal to an and-gate 305. Consequently the and-gate 305 passes the clockpulses $cb'_7$. The sequence of clockpulse $cb'_7$ at the output of the and-gate 305 is applied to a channelcounter 308, to a onebit register stage 309, to an addresscounter 310 and to an and-gate 311.

The channelcounter 308 is a cyclic modulo-32 pulsecounter. The channelcounter changes its state at the trailing edge of each clock pulse $cb'_7$, that is to say at the beginning of each new channel interval $t'$. This counter performs a countingcycle in 32 channelintervals $t'$. In each countingcycle the channelcounter supplies a sequence of 32 binary codewords at the group of codeoutputs 312, which sequence, in binary code, forms the equivalent of the sequence of decimal numbers 0, 1, . . . 31. In this way the succession of channelintervals $t'$ is divided into cycles of 32 channelintervals, to which are associated the decimal numbers 0 to 31 in the order of succession. The channelintervals of one cycle are designated in the order of succession by $t'_0, t'_1, \ldots t'_{31}$. Each cycle of 32 regenerated channelintervals $t'_0, t'_1, \ldots t'_{31}$ forms a regenerated frame $r'$. The clock pulse $cb'$ lying in the bitinterval $b'_i$ of channelinterval $t'_j$ ($i$ 1 0, 1, . . . 7 and $j = 0, 1 \ldots 31$) is designated by $cb'_i.t'_j$.

To the group of codeoutputs 312 of channelcounter 308 is connected a decoder 313 for the number 30, which applies in each channelinterval $t'_{30}$ a 1-signal to the input of the registerstage 309. Under the control of the clockpulses $cb'_7$ the logical state 1 appears at the output of the registerstage 309 in the channelintervals $t'_{31}$. The output of the registerstage 309 is connected to an input of the and-gate 311. The other input of the and-gate 311 receives the clock pulses $cb'_7$. As a result the and-gate 311 passes the clockpulses $cb'_7.t'_{31}$. These clockpulses are applied to a clockoutput designated in the same manner. The addresscounter 310 is a cyclic modulo-4 pulse counter. The counter changes its state at the trailing edge of each clockpulse $cb'_7$, that is to say at the beginning of each new channelinterval $t'$. This address-counter performs a countingcycle in 4 channelintervals $t'$. In each countingcycle the counter supplies the sequence of codewords $AN'_0, AN'_1, AN'_3$ at the group of code-outputs 314. These codewords represent in binary code the addresses of the shiftregisters included in the synchronizer 203. The sequence of addresses AN' is applied to the group of outputterminals designated accordingly. The leading edges of the 1-signals of the registerstage 309 in the channelintervals $t'_{31}$ each reset the counter 310 to the state 0. Thus the addresscounter 310 is constantly held in synchronism with the channelcounter 308 so that in the channelintervals $t'_{31}$ the address-counter supplies the address $AN'_0$.

A synchronizer 315, which is connected to the output of the bitregenerator 310, synchronizes in known manner the bitcounter 304 and the channelcounter 308 by means of the synchronizingwords received in the 31st timechannel of the incoming timemultiplexline. This synchronizer ensures that for each regenerated bit the number of the regenerated bitinterval $b'$ corresponds with the number of the bit in the codeword and that the number of the regenerated channelinterval $t'$ corresponds with the number of the incoming timechannel, from which the bit emanates. Since the addresscounter 310 is in synchronism with the channelcounter 308, the former supplies the address $AN'_0$ for the 31st incoming timechannel.

Figure 4:
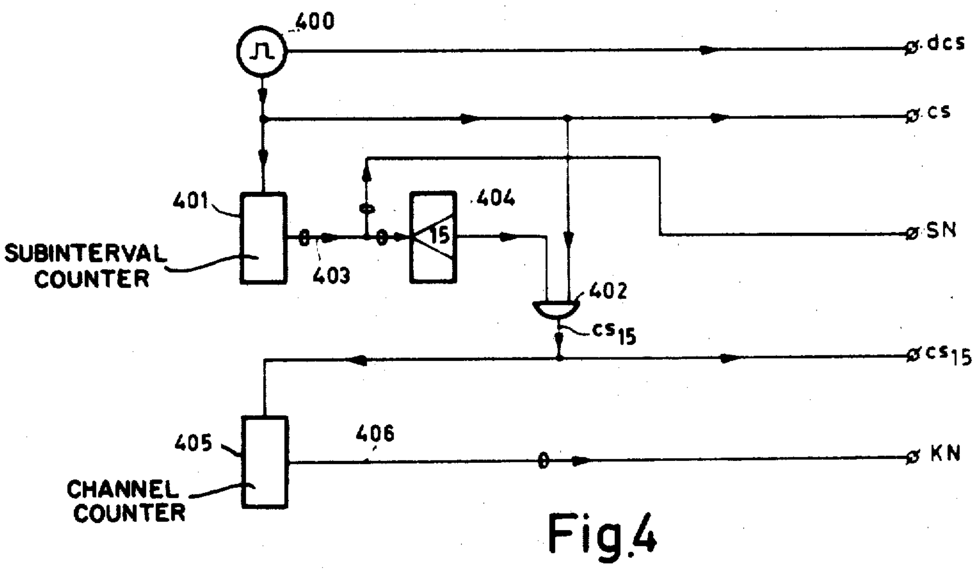
FIG. 4 shows the local clock of the transit exchange of FIG. 1.

The clock of the exchange shown in FIG. 4 comprises a local clockpulsegenerator 400. This clockpulse-generator supplies an equidistant sequence of clockpulses cs having a repetitionfrequency equal to twice the nominal repetitionfrequency of the bits of an incoming timemultiplexline. The succession of clockpulses $cs$ divides the time into equal subintervals $s$. The subinterval is assumed herein to be the time interval lying between the trailing edge of the clockpulse cs and the trailing edge of the nextfollowing clockpulse cs. Each subinterval $s$ has half the nominal duration of a regenerated bitinterval $b'$.

The sequence of clockpulses $cs$ is applied to a subintervalcounter 401, to an and-gate 402 and to a clockpulseoutput cs.

The clockpulsegenerator 400 supplies furthermore a sequence of shifted clockpulses dcs with a time lag of half a subinterval relative to the clockpulsesequence cs and applies them to a clockpulseoutput designated accordingly. The subintervalcounter 401 is cyclic modulo-16 pulsecounter. The subintervalcounter changes its state at the trailing edge of each clockpulse $cs$, that is to say at the beginning of each new subinterval $s$. This counter performs a countingcycle in 16 subintervals $s$. In each countingcycle this counter supplies a sequence of binary codewords $SN_0, SN_1, \ldots SN_{15}$ to the group of codeoutputs 406, which sequence forms the binary equivalent of the sequence of decimal numbers 0, 1, . . . 15. Thus the succession of subintervals $s$ is divided into cycles of 16 subintervals, to which are associated the decimal numbers 0 to 15 in the order of succession. The subintervals of one cycle are designated in order of succession by $s_0, s_1, \ldots s_{15}$. Each cycle of 16 subintervals $s_0, s_1, \ldots s_{15}$ forms a local channelinterval $t$. The clockpulse cs lying in subinterval $s_i$ ($i = 0, 1, \ldots 15$) is designated by $cs_i$. The sequence of code words SN, indicating in binary code the numbers of the subintervals is applied to the group of outputterminals designated accordingly. Each channel-interval $t$ has a duration equal to the nominal duration of a regenerated channel interval $t'$. The pairs of subintervals $s_{2j}, s_{2j+1}$ ($j$ 1 0, 1, . . . 7) form the local bitintervals $b_j$.

To the group of codeoutputs 403 is connected a decoder 404 for the number 15. This decoder supplies in the subintervals $s_{15}$ a 1-signal to an and-gate 402, which thus passes the clockpulses $cs_{15}$. The sequence of clockpuseoutput and to a channelcounter 405. This counter is a cyclic modulo-32 pulsecounter. The counter changes its state at the trailing edge of each clock pulse $cs_{15}$, that is to say at the beginning of each new localchannel-interval $t$. The counter performs a counting cycle in 32 channelintervals t. In each countingcycle the channelcounter supplies a sequence of binary codewords $KN_0, KN_1, \ldots KN_{31}$ at the group of codeoutputs 406, which sequence forms in binary code the equivalent of the sequence of decimal numbers 0, 1, . . . 31. Thus the sequence of channelintervals t is divided in cycles of 32 channel-intervals, to which are associated in the order of succession the decimal numbers 0 to 31. The channelintervals of one cycle are designated in order of succession by $t_0, t_1, \ldots t_{31}$. Each cycle of 32 local channelintervals $t_0, t_1, \ldots t_{31}$ forms a local frame $r$. The clockpulse $cs_i$, lying in the channelinterval $t_j$ ($i = 0, 1, \ldots 15$ and $j = 0, 1, \ldots 31$) is designated by $cs_i.t_j$. The sequence of codewords KN is applied to the group of outputterminals designated in the same manner.

A timechannel of an outgoing timemultiple line is designated by the number of the corresponding local channelinterval. Accordingly, the numbers of the local channelintervals are termed local channelnumbers. The code words KN, which indicate the channelnumbers in a binary code, are termed local channelnumbers KN.

Figure 5:
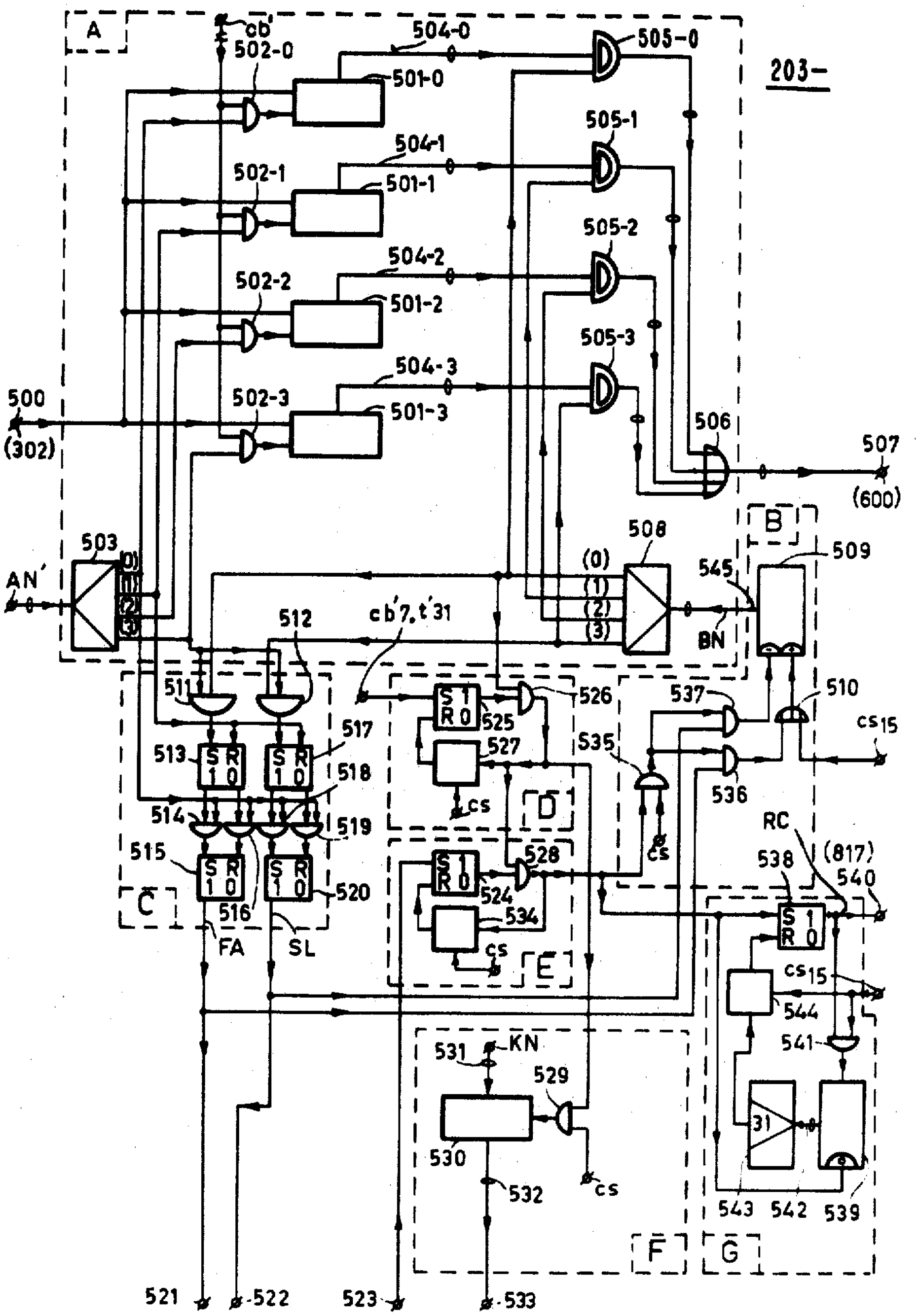
FIG. 5 shows a synchronizer (transposition arrangement) for matching different information rates.

The devices to be described hereinafter are controlled by signals originating from the local clock of FIG. 4 and, as far as the synchronizer 203- is concerned, which is shown in FIG. 5, also by signals originating from the regenerator 202- which is shown in FIG. 3. The terminals at which these controlsignals are received are designated in the same manner as the terminals of the clock and the regenerator from which these controlsignals are transmitted.

In each figure each output terminal connected to the input terminal of the circuit of another Figure has the reference numeral of the latter between brackets. The same applies to the input terminals with the exception of the terminals at which the controlsignals are received from the local clock or regenerator.

For facilitating the references the signals at the output terminals of the clock and the regenerator device are briefly indicated below:

Regenerator 202-, FIG. 3:

| Terminal | Signal |
|---|---|
| cb' | clockpulses $cb'_0, \ldots cb'_7$ in the bitintervals $b'_0, \ldots b'_7$ |
| $cb'_7.t'_{31}$ | clockpulses in the bitintervals $b'_7$ of the channelintervals $t'_{31}$ |

Local clock, FIG. 4:

| Terminal | Signal |
|---|---|
| cs | clockpulses $cs_0 \ldots cs_{15}$ in the subintervals $s_0 \ldots s_{15}$ |
| dcs | clockpulses shifted over half a subinterval relative to the clockpulses cs. |
| $cs_{15}$ | clockpulses in the subintervals $s_{15}$ |
| SN | sequence of subintervalnumbers $SN_0 \ldots SN_{15}$ in the subintervals $s_0, \ldots s_{15}$ |
| KN | sequence of the local channelnumbers $KN_0, \ldots KN_{31}$ in the channelintervals $t_0, \ldots t_{31}$ |

The synchronizer 203- of FIG. 5 comprises a plurality of parts surrounded in the Figure by broken lines, designated A, B, C, D, E, F and G.

Part A comprises an input terminal 500, to which the regenerated sequence of bits is applied. This bit-sequence is applied to the shiftregisters 501-0, 501-1, 501-2 and 501-3.

The decoder 503 decodes the addresses of the sequence AN', it being assumed that the address $AN'_j$ ($j = 0, 1, 2, 3$) sets the output $j$ in the logical state 1. The output $j$ of the decoder 503 is connected to an input of an and-gate **502-*j*, the output of which is connected to the clockinput of shiftregister 501-*j*. To the other input of and-gate 502-*j* are supplied the clockpulses cb'. At the appearance of the address $AN'_j$ the sequence of clockpulses $cb'_0, cb'_1, \ldots cb'_7$ is applied to the clock-input of shiftregister 501-*j*. The codeword applied to the input terminal 500 at the appearance of address $AN'_j$ is then stored in shiftregister 501-*j*. In this way the codewords received at the input terminal 500 are distributed cyclically among the four shiftregisters. The codewords originating from the incoming timechannel 31 in this case the timechannel for synchronisation, are invariably stored in the shiftregeister 501-0** that is indicated by the address $AN'_0$.

After the introduction of a complete codeword in a shift register **501-*j* ($j = 0, 1, 2, 3$) the codeword is presented in parallelform to the group of outputs 504-*j*. This group of outputs is connected to the group of inputs of a multiple and-gate 505-*j*, the group of outputs of which is connected through an or-gate 506 to the group of Outputterminals 507. The single input of the and-gate 505-*j* is connected to the output $j$ of the decoder 508. When the output $j$ is in the logical state 1, the and-gate 505-*j* passes the codeword appearing at the group of inputs. This codeword is passed via the or-gate 506 to the group of output terminals 507**.

The shiftregisters 501- are cyclically read under the control of an addresscounter 509 in part B. Through the or-gate 510 the clock pulses $cs_{15}$ are applied to the addinginput of counter 509. It is provisionally assumed that no other pulses than the clockpulse $cs_{15}$ are applied to the addresscounter 509. The counter 509 is a cyclic modulo-4 pulsecounter, which, like the address-counter 310, supplies the sequence of addresses $BN_0$, $BN_1$, $BN_2$, $BN_3$ to the group of codeoutputs 511 in each counting-cycle having the duration of 4 channel intervals $t$. The decoder 508, which is connected to the group of codeoutputs 511, decodes the addresses of the sequence BN, it being assumed that the codeword $BN_i$($i = 0, 1, 2, 3$) sets the output ($i$) in the logical state 1. The codeword presented at the group of outputs of shiftregister **501-*i* is then applied to the group of outputterminals 507** during the appearance of the address $BN_i$.

At the group of outputterminals 507 a sequence of codewords originating from the shiftregisters 500-0, 500-1, 500-2, 500-3 appears in cyclic order of succession. Each of these codewords lies in a local channelinterval $t$. In order to assess the relation between the regenerated channelinterval $t'$, in which a codeword is received at the input terminal 500, and the local channelinterval $t$, in which the codeword is applied to the group of output terminals 507 or in other words the relation between the numbers of the incoming timechannels and the local channelnumbers, the parts D and F comprise means which will now be described.

To the setting input of S-R flipflop 525 in part D are applied the clockpulses $cb'_7.t'_{31}$. The flipflop is set in the logical state at the leading edge of each of these clockpulses. An and-gate 526 combines the logical states of flipflop 525 and the output (0) of the decoder 508. As described above, the codewords originating from the incoming timechannel 31 are written in shiftregister 501-0. The logical state 1 of flipflop 525 indicates that a codeword lying in the regenerated channelinterval $t_{31}$ is applied to the inputterminal 500. When the output 508-(0) is in the logical state 1, the codeword stored in shift-register 501-0 is applied to the group of outputterminals 507. The output of and-gate 526 is in the logical state 1, when the two inputs are in the logical state 1. Consequently, the logical state 1 at the output of and-gate 526 indicates that a codeword originating from the timechannel 31 is being read. The local channel interval $t$, in which this occurs, is designated by $t_x$.

The output of and-gate 526 is connected to the output of a onebitregisterstage 527, to part E and to part F. To the clockinput of registerstage 527 are applied the clockpulses $cs$. The and-gate 526 is set in the logical outputstate 1 at the beginning of each channelinterval $t_x$. Consequently, a binary 1 is stored in the registerstage 527 in each frame $r$ at the trailing edge of the clockpulse $cs_0.t_x$. The output of registerstage 527 is connected to the resetting input of flipflop 525. The latter is set in the logical state 0 at the leading edge of the 1-signal at the output of the registerstage 527. As a result an and-gate 526 is set in the logical outputstate 0 untill the channelinterval $t_x$ of the next-following frame $r$. At the trailing edge of the clockpulse $cs_1.t_x$ a binary 0 is stored in registerstage 527. The registerstage remains in this state until the channelinterval $t_x$ of the next-following frame $r$.

In part F the output of the and-gate 526 is connected to an input of an and-gate 529, the output of which is connected to the clockinput of a register 530. To the group of inputs 531 of register 530 is applied the sequence of local channelnumbers KN. The other input of and-gate 529 receives the clock pulses $cs$. Consequently, the and-gate 529 passes the clockpulses $cs_0.t_x cs_0.t_x$ the register stores the local channelnumber $KN_x$ applied to the group of inputs 531 and presents this number to the group of outputs 532, which are connected to the group of output-terminals 533. The local channelnumber $KN_x$ stored in register 530 is the local channelnumber of the incoming time channel 31.

A central control arrangement can take over, in a manner not shown, by taking access to the group of output terminals 533, the local channelnumber $KN_x$ and thus determine the corresponding local channelnumber for each incoming timechannel.

In part C of synchronizer 203- (FIG. 5) the shift between the timescales for writing and reading in the shiftregisters 501- is checked. A signal FA is supplied when writing has overtaken reading to an extent such that a risk of coincidence occurs and a signal SL is supplied when the risk of coincidence occurs because reading overtakes writing. Part C operates as follows.

The output (3) of the decoder 503 is connected to an input of and-gate 511 and and input of and-gate 512. The other input of and-gate 511 is connected to the output (0) of the decoder 508. The other input of and-gate 512 is connected to the output (3) of the decoder 508. First the case is considered in which writing overtakes reading. In this case at the beginning of a channelinterval $t$, in which the output 503-3 is set in the logical state 1 the and-gate 511 will assess coincidence between two logical states 1 so that flipflop 513 is set in the state 1. This state is taken over by flipflop 515 via the and-gate 514 at the instant when the output 503-(0) connected to the and-gate 514 is set in the logical state 1. Flipflop 513 is reset to the state 0 at the instant when the output 503-(1) connected to the resetting input thereof is set in the logical state 1. Flipflop 515 remains in the logical state 1 as long as and-gate 511 detects coincidence between two logical states 1. After elimination of the coincidence the logical state 0 of flipflop 513 is taken over via and-gate 516 by flipflop 515 at the instant when the output 503-(0) is set in the logical state 1. At the instant of actuation of and-gate 511 the regenerated channelinterval $t'$, in which a codeword is written in an arbitrary shiftregister (partly) coincides with the local channelinterval $t$, in which a codeword is read in the next shiftregister. The latter channelinterval operates as a timeinterval of protection against coincidence of the channelinterval $t'$, in which an arbitrary shift register is written in and the channel interval $t$, in which the register is read out, after flipflop 515 has been set in the logical state 1.

Monitoring in the case in which reading overtakes writing is carried out in a similar by means of the and-gate 512, the flipflops 517 and 520 and the and-gates 518 and 519. At the instant when the and-gate 512 is actuated, the first part of the channelinterval $t'$, in which an arbitrary shiftregister is written in coincides with the first part of the channel interval $t$, in which the shiftregister is read out. It will be apparent hereinafter that only the codewords read in the subintervals $s_{15}$ are stored in the switchingstore. In this case the subintervals $s_o, s_1, \ldots s_{14}$ of the channelinterval $t$, in which an arbitrary shiftregister is read out, operates as a protective interval against coincidence of the channelinterval $t'$, in which the shiftregister is written in, and the subinterval $s_{15}$ of the lastmentioned channelinterval $t$, after flipflop 520 has been set in the logical state 1.

The 1-outputs of the flipflops 515 and 520 are connected to the outputterminals 521 and 522. A central control arrangement can detect, in a manner not shown, by taking access to said outputterminals, the presence of a signal FA or of a signal SL. When the central control arrangement detects a signal FA or a signal SL, it passes a correctioninstruction to an inputterminal 523 by setting it in the logical state 1 for the duration of a subinterval.

In part E flipflop 524 is set in the state 1 at the leading edge of the 1-signal of terminal 523. The 1-output of flipflop 524 is connected to an input of and-gate 528. The other input of the and-gate 528 is connected to the output of the and-gate 526. The output of the latter and-gate is set in the logical state 1 at the beginning of each local channelinterval $t_x$, in which a codeword originating from the incoming time channel 31 is read from shift register 501-0. The and-gate 528 is set in the logical outputstate 1 at the beginning of the first local channelinterval $t_x$ occurring after a correctioninstruction has been received at inputterminal 523. The output of the and-gate 528 is connected to part B, to part G and to the input of a onebitregisterstage 534. The registerstage 534 is controlled by the clockpulses $cs$. Consequently, a binary 1 is stored in the registerstage 534 at the trailing edge of the clockpulse $cs_o.t_x$ of the last-mentioned channelinterval $t_x$. The output of a registerstage 534 is connected to the resettinginput of flipflop 524. The latter is set in the logical stage 0 at the leading edge of the 1-signal of registerstage 534 and resets the and-gate 528 in the logical outputstate 0. At the trailing edge of the clockpulse $cs_1.t_x$ of the last-mentioned channelinterval $t_x$ a binary 0 is then stored in registerstage 534. Part E is then in the reststate, which is maintained until a new correctioninstruction is received.

In part B the output of the and-gate 528 is connected to an input of the and-gate 535. The other input of and-gate 535 receives the clockpulses $cs$. Consequently, the and-gate 535 passes the clockpulse $cs_o.tx$ lying in the first local channelinterval $t_x$ occurring after the receipt of a correctioninstruction. The output of the and-gate 535 is connected to an input of the and-gate 536 and to an input of the and-gate 537. The other input of the and-gate 536 is connected to the 1-output of flipflop 515 of part C. The other input of the and-gate 537 is connected to the 1-output of flipflop 520 of part C. When part C supplies a signal FA, the and-gate 536 passes the last-mentioned clockpulse $cs_o.t_x$, which is applied through the or-gate 510 to the addinginput of the addresscounter 509. The latter is at this instant in the state $BN_o$ because in the channel interval $t_x$ the shiftregister 501-0 is being read out. The clockpulse $cs_o.t_x$ applied to the addinginput sets the addresscounter 509 in the state $BN_1$. This will be referred to hereinafter as a positive correctionstep or a positive correction of addresscounter 509. If part C supplies a signal SL, the and-gate 537 passes the clockpulse $cs_o.t_x$, which is applied to the subtractioninput of addresscounter 509. This clockpulse sets the addresscounter 509 in the state $BN_3$. This will be referred to hereinafter as a negative correctionstep or a negative correction of the addresscounter 509. In both cases the distance between the channelinterval $t'$, in which an arbitrary shiftregister is being written in and the channelinterval $t$, in which the shiftregister is being read out, is increased by one local channelinterval so that the state of coincidence at the and-gate 511 or the and-gate 512 part C is obviated.

The switchingstore only registers codewords supplied in the subintervals $s_{15}$. It is then not important for the switchingstore when a first codeword is supplied in the subinterval $s_o$ and after a correctionstep of the addresscounter 509 a second codeword is supplied in the subintervals $s_1$ to $s_{15}$. The switchingstore only registers the second codeword.

When the addresscounter 509 performs a positive or a negative correctionstep, a local channelnumber will be stored in register 513 of part F at the beginning of the next-following chennelinterval $t_x$, which number is lower or higher respectively by one than the number stored at that instant in the register, that is to say $x$ is decreased by 1 or increased by 1 respectively. Each time when the addresscounter 509 performs a positive correctionstep, the codeword then stored in the shiftregister 501-0 is not written in the switchingstore. Since this codeword originates from the incoming time channel 31, which is the synchronization channel, no variable information gets lost. Each time when the addresscounter 509 performs a negative correctionstep, the codeword stored at this instant in shiftregister 500-3 and already written in the switchingstore in the preceding local channelinterval is again written in the switchingstore. This applies to a codeword of the incoming time channel 30.

The time scale of a sequence of events, for example, the appearance of codewords, speaking in general, is defined as usual as follows: Time marks are plotted on the time axis so that in a time interval limited by a time mark and the nextfollowing time mark one and only one event occurs and a time interval is associated with each event.

The sequence Q of the codewords appearing in the subintervals $s_{15}$ at the group of output terminals 507 is, considered in itself, a regular sequence. The timescale of this sequence is the local timescale formed by the local channelintervals $t$. The sequence P of the codewords appearing at the input terminal 500 is also a regular sequence. The timescale thereof is the regenerated timescale formed by the regenerated channelintervals $t'$. The time scale of the sequence of codewords at the input of a synchronizer is termed the time scale of reception.

The sequence Q is not identical to the sequence P, because at each positive correction of the addresscounter 509 a codeword of the sequence P does not get into the sequence Q and at each negative correction of the address counter 509 a codeword appears in the sequence correction of the address counter 509 a codeword appears in the sequence Q, which is not found in the sequence P. The local timescale is, in accordance with the above definition, not a timescale of sequence P. For the sequence P a timescale can also be defined at the group of output-terminals 507, whilst utilizing the above definition. This timescale is termed the transformed timescale of the sequence P. The transformed timescale comprises normally intervals coinciding each with one local channel-interval. This is true as long as the addresscounter 509 does not perform a correction step. For each positive correction step the transformed timescale comprises an interval of the length O. In this case a codeword of a sequence P is omitted. For each negative correction step the transformed timescale comprises an interval which coincides with two consecutive local channelintervals. In this case a codeword of the sequence P appears in two local channelintervals so that the sequence Q, whose time scale comprises only intervals of the length of one local channel interval comprises twice the same codeword, one after the other.

The intervals of the length 0 and those of two local channelintervals, which may be considered to be scaleshifts relative to the local timescale, hold the transformed timescale in synchronism with the timescale of reception. The timescaleshifts each have the magnitude of one local channel interval so that the overall shift of the transformed timescale relative to the local timescale is a quantified magnitude, which can only be an integral multiple of local channelintervals. The shift of the timescale of reception relative to the local timescale, on the contrary, is an analogue magnitude, which may assume analogue values.

The correction of the addresses in the addressing arrangement for reading in the switchingstore requires a signal of the length of a local frame which appears after the receipt of a correction instruction. This signal, which is termed the frame correctionsignal RC, is produced by part G of FIG. 5.

In part G the output of and-gate 528 of part E is connected to the setting input of a flipflop 538 and to the resetting terminal of a modulo-32 counter 539. The and-gate 528 is set in the logical outputstate 1 at the beginning of the first channelinterval $t_x$ occurring after the receipt of a correction instruction. The channel-interval $t_x$ is the local channelinterval associated with the incoming timechannel 31. The leading edge of the 1-signal of the and-gate 528 sets the flipflop 538 in the logical state 1 and resets counter 539 to the state 0. The 1-output of flipflop 538 is connected to the output terminal 540 for the framecorrectionsignal RC and to an input of an and-gate 541. To the other input of and-gate 541 are applied the clockpulses $cs_{15}$. Consequently, the and-gate 541 passes the clockpulses $cs_{15}$ as soon as flip-flop 538 is set in the logical state 1. The first clockpulse $cs_{15}$ passed is the clockpulse $cs_{15}.t_x$. The output of the and-gate 541 is connected to the input of counter 539. To the group of codeoutputs 542 of counter 539 is connected a decoder 543 for the number 31, the output of which is connected to a onebitregisterstage 544. The clockpulses $cs_{15}$ are applied to the clockinput of registerstage 544. At the trailing edge of the 31st clockpulse $cs_{15}$ passed by the and-gate 541, that is to say the clockpulse $cs_{15}.t_{(x+30)\ mod.32}$, the output of the decoder 543 is set in the logical state 1. Consequently, the nextfollowing clockpulse $cs_{15}$, that is to say the clockpulse $cs_{15}.t_{(x+31)\ mod\ 32}$, a binary 1 is stored in the registerstage 544. The output of the registerstage 544 is connected to the resettinginput of the flipflop 538. The leading edge of the 1-signal at the output of registerstage 544 sets flipflop 538 back to the state 0, so that the and-gate 541 is rendered inoperative. In this way the flipflop 538 is in the logical state 1 from the beginning of the first channelinterval $t_x$ occurring after the receipt of a correction instruction until the end of the nextfollowing channel interval $t_{(x+31)\ mod\ 32}$.

For the further description it is important to remember the following points.

a. Synchronizer 203- supplies in each subinterval $s_{15}$ a codeword to the corresponding sector of the switchingstore.

b. A positive correction of the addresscounter 509 results in the loss of a codeword and a decrease by 1 of the local channelnumbers associated to the incoming time channels.

c. A negative correction of addresscounter 509 results in the insertion of an additional codeword and an increase by 1 of the local channelnumbers associated with the incoming timechannels.

Figure 6:
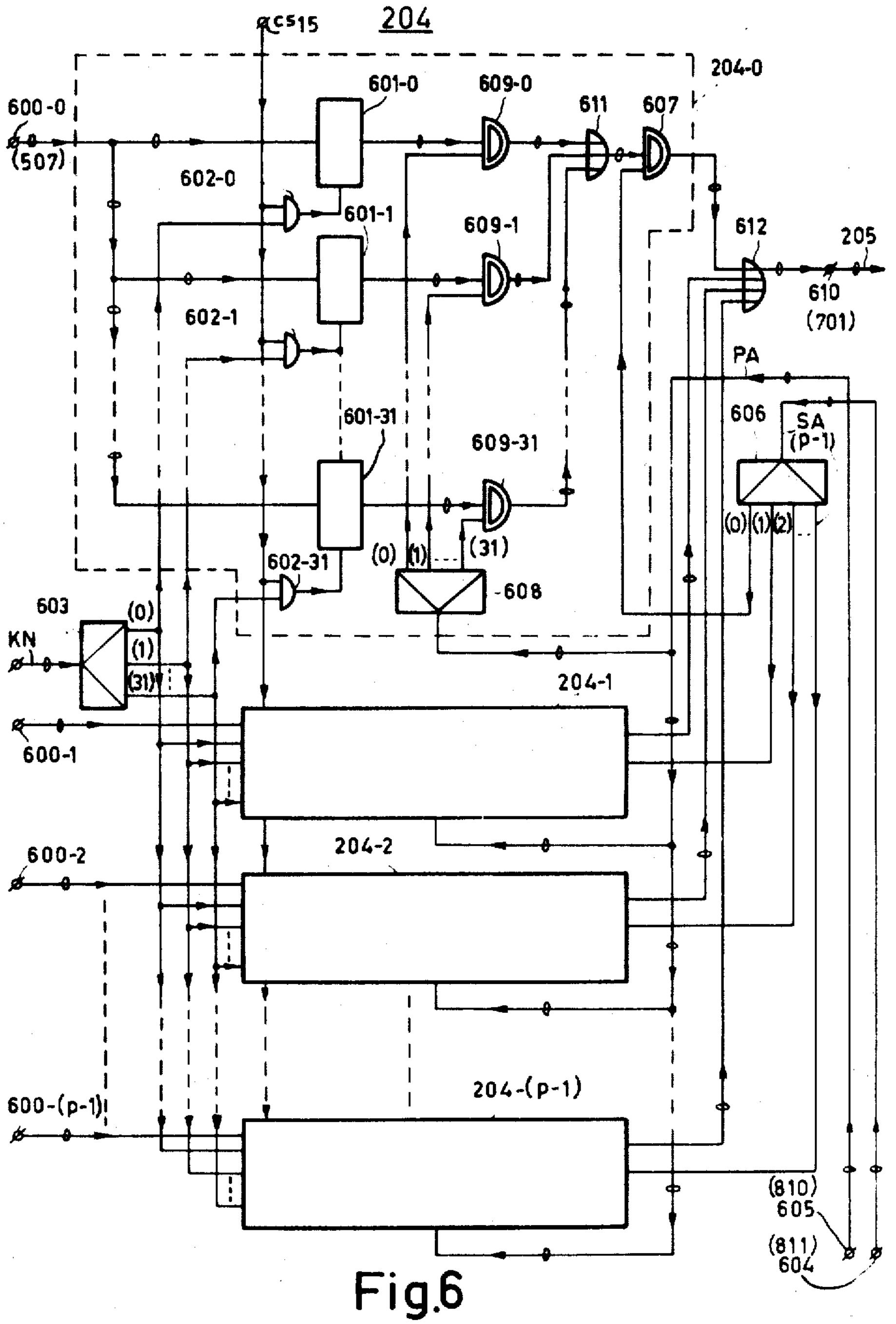
FIG. 6 shows the switching store of the transit exchange of FIG. 2.

The switching store 204 of FIG. 6 comprises $p$ ($p = 15$) sectors 204-0, 204-1, 204-2, . . . 204-($p$-1), all of which are of the same structure as the sector 204-0. Each sector 204-$i$ ($i = 0, 1, 2, \ldots (p-1)$) comprises a group of input terminals 600-$i$, which are connected to a group of output terminals 507 of the corresponding synchronizer 203-i as shown in FIG. 5. The sector 204-0 is shown in further detail and will now be described.

The sector 204-0 comprises 32 onewordregisters 601-0, 601-1, . . . 601-31, the groups of inputs of which are connected in parallel with the group of input terminals 600-0. With each register 601-$j$ ($j = 0, 1, \ldots 31$) is associated and and-gate 602-$j$, the output of which is connected to the clockinput of the register. To an input of the and-gate 602-$j$ are applied the clockpulses $cs_{15}$. The other input of and-gate 602-$j$ is connected to the output $j$ of the decoder 603.

The decoder 603 decodes the local channelnumbers of the sequence KN, it being assumed that the number $KN_j$ ($j = 0, 1, \ldots 31$) sets the output $j$ in the logical state 1. During the receipt of the local channelnumber $KN_j$, the and-gate 602-$j$ passes a clockpulse $cs_{15}$. This is the clock pulse $cs_{15}.t_j$. The codeword supplied in the subinterval $s_{15}.t_j$ to the group of input terminals 600-0 is then stored in the register 601-$j$. In this way the codewords of an incoming timechannel are written in a register, the address of which is given by the local channelnumber of the relevant incoming timechannel.

The read address of a register has two parts i.e. a sectoraddress and a locationaddress, the latter indicating the location of the register in the sector.

The sectoraddresses are designated by $SA_0, SA_1, \ldots SA_{(p-1)}$, and the locationaddresses are designated by $PA_0, PA_1, \ldots PA_{31}$. Reading in the switchingstore is performed in the subintervals $s_0$ to $s_{14}$. The addressing arrangement for reading in the switchingstore, shown in FIG. 8, supplies the sectoraddress to the group of input-terminals 604 and the locationaddress to the group of inputterminals 605 in each subinterval in which the switchingstore has to be read out.

The locationaddresses PA are supplied in parallel to all sectors of the switchingstore. In sector 204-0 the locationaddresses are decoded by the decoder 608, it being assumed that the address $PA_j$ ($j = 0, 1, \ldots 31$) sets the output 608-$j$ in the logical state 1. In a similar manner the locationaddresses are decoded in the other sectors.

With each register 601-1$j$($j = 0. 1. \ldots 31$) of sector 204-$j$ is associated a multiple and-gate 609-$j$), the group of inputs of which is connected to the group of outputs of the corresponding register. The single input of the and-gate 609-$j$ is connected to the output $j$ of the decoder 608. The groups of outputs of the and-gates 609-0, 609-1, . . . 609-31 are connected to a multiple or-gate 611, the group of outputs of which is connected to a multiple and-gate 607.

The sectoraddresses SA are decoded by the decoder 606, it being assumed that the address $SA_i$ ($i = 0, 1, \ldots (p-i)$) sets the output $i$ in the logical state 1. The output 0 is connected to the single input of the and-gate 607 in sector 204-0. The other outputs are connected to the corresponding and-gates in the other sectors.

The group of outputs of the and-gate 607 and the groups of outputs of the corresponding and-gates of the other sectors are connected to a multiple or-gate 612, the group of outputs of which is connected to the group of outputterminals 610.

When the sectoraddress $SA_0$ and the location-address $PA_j$ ($j = 0, 1, \ldots 31$) are received the and-gates 609-$j$ and and-gates 607 of sector 204-0 are rendered operative. As a result the codeword presented by the register 601-$j$ at the group of outputs thereof is passed via these and-gates and the or-gates 611 and 612 to the group of outputterminals 610. In general, at the reception of the sector address $SA_i$ ($i = 0, 1, \ldots (p$-i$)$) a codeword is read from the sector 204-$i$.

To the group of outputterminals 610 is connected the supertimemiltiplexline 205, which connects the switchingstore 204 to the demultiplexer 206.

Figure 7:
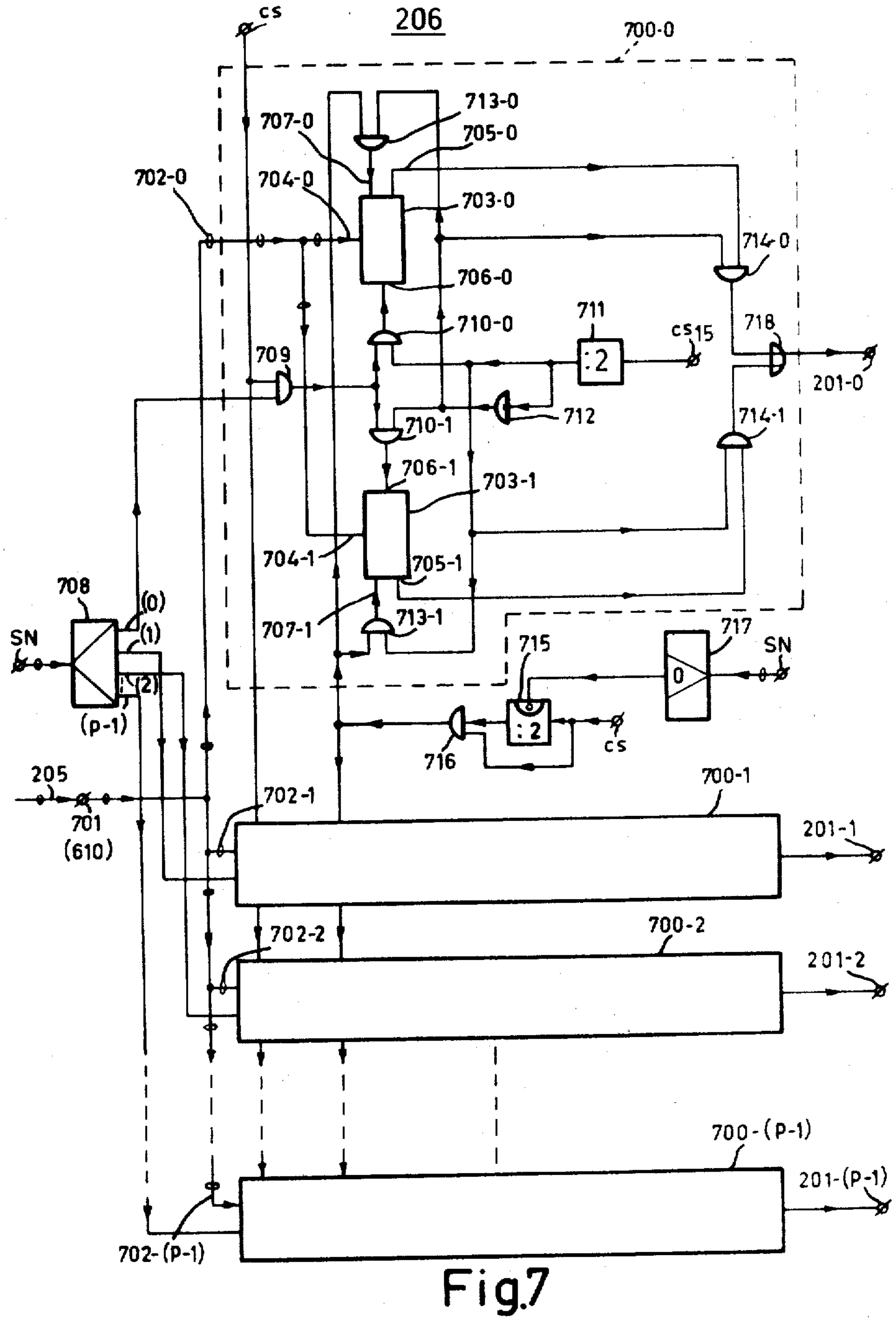
FIG. 7 shows the demultiplexer of the transit exchange of FIG. 2.

The demultiplexer 206 shown in FIG. 7 comprises p parallel-seriesconverters 700-0, 700-1, 700-2, . . . 700-($p$-1), which are individually associated with the outgoing timemultiplexlines 201-0, 201-2. . . . 201-($p$-1). The demultiplexer comprises a group of inputterminals 701, to which the supertimemultiplexline 205 is connected. Each parallel-series converter 700-$i$ ($i=0, 1, \ldots (p-1)$), has a group of inputs 702-$i$. All groups of inputs 702-0, 702-1, 702-2..702-($p$-1) are connected in parallel with the group of input terminals 701. All parallel-seriesconverters are constructed in an identical manner. The parallel-seriesconverter 700-0 is shown in detail and will now be described.

The parallel-seriesconverter 700-0 comprises two onewordshiftregisters 703-0 and 703-1. Each shift-register 703-$j$ ($j = 0, 1$) has a group of inputs 704-$j$ for receiving in parallelform a codeword and an output 705-$j$ for transmitting a codeword in serialform. Each shiftregister 703-$j$ has furthermore a clockinput 706-$j$ for controlling the takeover of a codeword from the group of inputs 704-$j$ and a clockinput 707-$j$ for controlling the transmission of a codeword via the output 705-$j$.

A decoder 708 decodes the numbers of the sequence SN, it being assumed that the number $SN_i$ ($i=0, 1, 2, \ldots (p-1)$) sets the output 708-($i$) in the logical state 1. The output 708-(0) is connected to an output of and-gate 709 in the parallel-seriesconverter 700-0. The other outputs 708-(1), 708-(2) . . . 708-($p$-1) are connected to corresponding and-gates in the parallel-seriesconverters 700-1, 700-2, . . . 700-(p-1). The clockpulses $cs$ are applied to the other input of the and-gate 709 and to the corresponding and-gates in the other parallel-seriesconverters. At the reception of the number $SN_o$ the output 708-(0) is set in the logical state 1 and the and-gate 709 passes a clockpulse $cs$. This is the clockpulse $cs_o$. The corresponding and-gates in the parallel-seriesconverters 700-1, 700-2 . . . 700-($p$-1) pass the clockpulses $cs_1, cs_2 \ldots cs_{14}$ respectively ($p=15$).

The output of the and-gate 709 is connected to an input of the and-gate 710-0 and to an input of the and-gate 710-1, the outputs of which are connected to the clockinputs 706-0 and 706-1 of the shiftregisters 703-0 and 703-1. The other input of the and-gate 710-0 is connected to the output of the binary stage 711 and the other input of the and-gate 710-1 is connected through an inverter 712 to the output of the binary stage 711. The binary stage 711 is controlled by the clockpulses $cs_{15}$ and changes its outputstate at the trailing edge of each clockpulse. The and-gates 710-0 and 710-1 then pass alternately a clockpulse $cs_o$ so that the codewords supplied in the subintervals $s_o$ to the group of input-terminals 701 are alternately stored in the shiftregisters 703-0 and 703-1.

To the clockinputs 707-0 and 707-1 are connected the outputs of the and-gates 713-0 and 713-1. To an input of the and-gate 713-0 and to an input of the and-gate 713-1 is applied the sequence of odd-numbered clockpulses cs. These clockpulses appear at the end of each local bitinterval. The other input of the and-gate 713-0 is connected through the inverter 712 to the output of the binary stage 711 and the other input of the and-gate 713-1 is directly connected to the output of the binary stage 711. The and-gates 713-0 and 713-1 then pass alternately the sequence of odd-numbered clock pulses $cs_1, cs_3, \ldots cs_{15}$. The and-gates 710-0 and 713-0 are controlled in phaseopposition by the binary stage 711, like the and-gates 710-1 and 713-1. In this way in the channel interval, in which a codeword is stored in the shiftregister 703-0, a codeword is transmitted from the shiftregister 703-1 and conversely.

The output 705-$j$ ($j = 0, 1$) of shiftregister 703-$j$ is connected to an input of the and-gate 714-$j$, the output of which is connected through the or-gate 718 to the outgoing timemultiplexline 201-0. The other input of the and-gate 714-0 is connected via the inverter 712 to the output of the binary stage 711 and the other input of the and-gate 714-1 is directly connected to the output of the binary stage 711. The and-gate 714-$j$ ($j=0, 1$) is then actuated simultaneously with the and-gate 713-$j$. The codeword read in the serialform from the shiftregister 703-$j$ under the control of the sequence of odd-numbered clockpulses $cs_1, cs_3, \ldots cs_{15}$ is then passed by the and-gate 714-$j$ to the outgoing timemultiplexline 201-0.

The sequence of odd-numbered clockpulses $cs$ is obtained as follows. The clockpulses cs are applied to the binary stage 715, the output of which is connected to an input of the and-gate 716. The other input of the and-gate 716 receives the clockpulses $cs$. The binary stage 715 changes its state at the trailing edge of each clockpulse cs. Consequently, the clockpulses cs are alternately passed and blocked by the and-gate 716. To a decoder 717 for the number 0 is applied the sequence of the numbers SN. The output of the decoder 717 is connected to the resetting-input of the binary stage 715. At the reception of the number $SN_o$ the output of the decoder 717, is set in the logical state 1. The leading edge of the 1-signal of this output sets the binary stage 715 in the logical output state 0. Thus the binary stage is synchronized so that the and-gate 716 passes the odd-numbered clockpulses $cs$ and blocks the even-numbered clockpulses cs.

The parallel-seriesconverter 700-0, as described above, receives the codewords supplied in the subintervals $s_o$ to the group of inputterminals 701. In general, the parallel-seriesvoncerter 701-i ($i=0, 1, 2, \ldots (p$-i)) receives the codewords appearing in the subintervals $s_i$. The codewords appearing in the subinterval $s_i.t_{(j-1)\ mod\ 32}$ with $i=0, 1, \ldots (p-1)$ and $j=0, 1, \ldots 31$ are transmitted by the parallel-seriesconverters 700-$i$ in the channelconverters 700-$i$ in the channelinterval $t_j$. Using the notation $t_j^*$ the subinterval $s_i.t_{(j-1)\ mod\ 32}$ on the supertimemultiplexline 205 is indicated by $s_i.t_j^*$.

Figure 8:
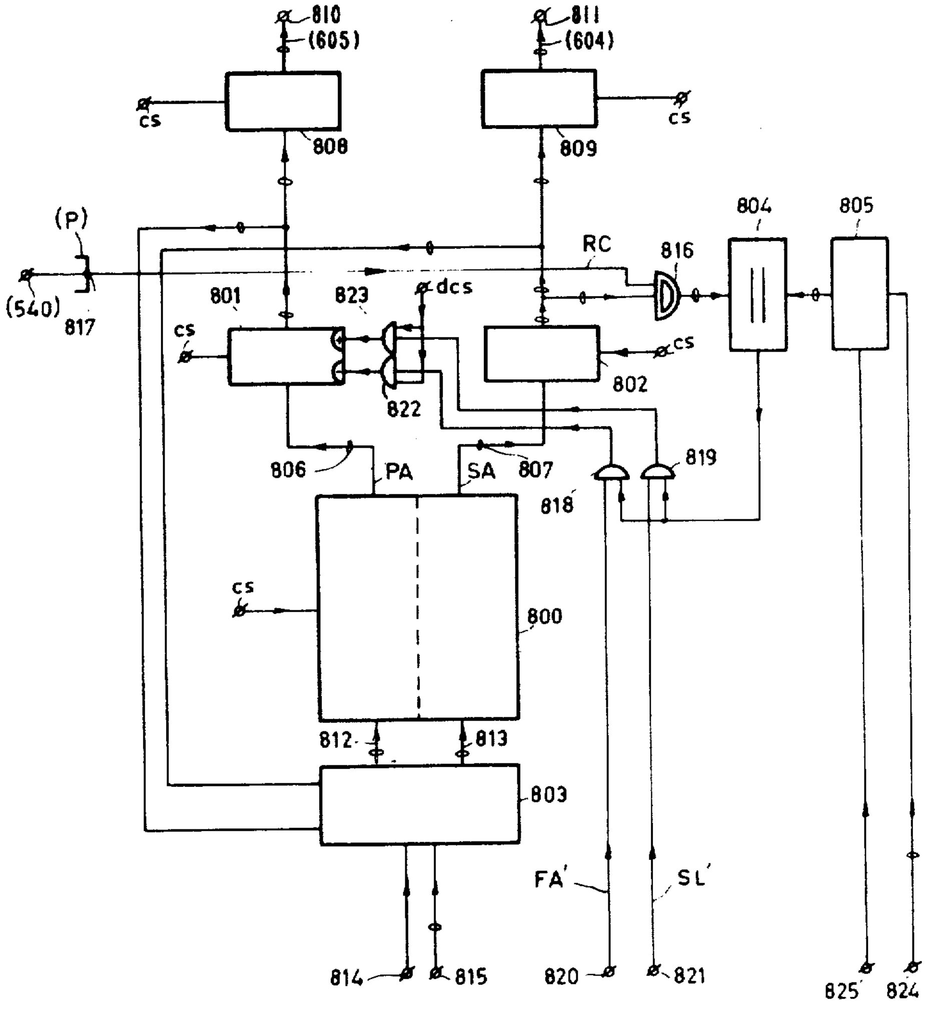
FIG. 8 shows the addressing arrangement for reading in the switching store of FIG. 8.
Figure 9:
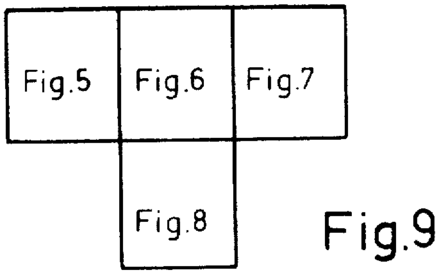
FIG. 9 shows the arrangement of FIGS. 5, 6, 7 and 8.

The addressing arrangement for reading in the switchingstore 204, shown in FIG. 8, comprises mainly a shiftstore 800, the registers 801, 802, 808 and 809, an inputpart 803 for reinserting the readant addresses or introducing new addresses, a comparator 804 and a sectoraddressregister 805.

The store 800 including the registers 801 and 802 comprises $16 \times 32$ storagelocations corresponding to the number of subintervals s of a local frame $r$. In each of these storagelocations the readaddress of a register of the switchingstore formed by a locationaddress PA and a sectoraddress SA can be stored. The store supplies under the control of the clockpulses $cs$ a periodic sequence of readaddresses, which are lying in different subintervals. This sequence has a period equal to a local frame. A given readaddress, after the introduction into the store 800, is periodically presented by the store at the output in a subinterval s having the same subintervalnumber and the same channelnumber in each raster frame until the read-address is definitely removed from the store 800.

The locationaddresses PA are presented in the parallelform at the group of outputs 806 and the sector-addresses SA are presented in the parallelform at the group of outputs 807. The group of outputs 806 is connected to the register 801 and the group of outputs 807 is connected to the register 802. Each address supplied to the register 801 or 802 in a subinterval $s_j$ ($j=0, 1, \ldots 15$) is stored by the clock pulse $cs_j$ of that subinterval in the register. The register presents the stored code-word at the group of outputs thereof in the subinterval $s_{j+1}$)mod 16.

The groups of outputs of the registers 801 and 802 are connected to the inputpart 803 and to the registers 808 and 809. The latter registers take over the supplied addresses under the control of a clockpulse cs at the end of each subinterval and present each codeword in parallel-form at the groups of outputterminals 810 and 811 in the next subinterval.

The inputpart 803 comprises means not shown in FIG. 8, which ensure in known manner that each location-address PA presented by register 801 is supplied to the group of storageinputs 812 and that each sectoraddress SA presented by the register 802 is supplied to the group of storageinputs 813. The inputpart furthermore comprises means, which, at the occurrence of an instruction to introduce a new readaddress at the input terminal 814, render the former means temporarily inoprative and which supply the new readaddress presented at the group of inputterminals 815 to the groups of storageinputs 812 and 813.

The register 801 is a simple arithmetic register capable of carrying out two simple arithmetic operations. One operation consists in increasing the stored address by one-modulo 32 and the other operation consists in decreasing a stored address by one-modulo 32. The register comprises an addinginput and a subtractinginput, to which the instructions for said two operations can be applied.

The group of outputs of register 802 is connected to the group of inputs of the multiple and-gate 816. The group of outputs of the and-gate 816 is connected to the comparator 804 and the single input is connected to the input terminal 817. To the input terminal 817 are connected the output terminals 540 for the frame correctionsignal RC of all synchronizers **203-0, 203-1, 203-2, ... 203-(*p*-1)**.

The output of comparator 804 is connected to an input of the and-gate 818 and to an input of the and-gate 819. The other input of the and-gate 818 is connected to the inputterminal 820 and the other input of the and-gate 819 is connected to the inputterminal 821. The output of the and-gate 818 is connected to an input of the and-gate 822, the output of which is connected to the sub-tractinginput of register 801. The output of the and-gate 819 is connected to an input of the and-gate 823, the output of which is connected to the addinginput of register 801. To the other input of the and-gate 822 and to the other input of the and-gate 823 are applied the clockpulses *dcs*. When in a subinterval s the and-gate 818 is in the logical outputstate 1, the and-gate 822 passes a clockpulse *dcs* and the address stored in register 801 is decreased by 1. If the and-gate 819 is in the logical outputstate 1, the and-gate 823 passes a clockpulse dcs and the address is increased by 1. The address taken over by register 808 at the end of the subinterval *s*, in which a clock pulse *dcs* is applied to register 801, is then a modified address.

As described, the codewords originating from an incoming timechannel are stored in a location of the corresponding sector of the switchingstore, the location-address being given by the local channel number of the relevant incoming timechannel.

A connectingchannel between an incoming time-channel and an outgoing timechannel will now be described in detail. Provisionally it will be assumed that the incoming timechannel under consideration has a fixed local channelnumber.

As a general example a connectingchannel between the $i^{th}$ incoming timechannel of the incoming timemultiplexline **200-*j* and the $k^{th}$ outgoing timechannel of the outgoing timemultiplexline 200-*m*** (*j* and m having one of the values 0, 1, 2, . . . (*p*-1) and *i* and *k* having one of the values 0, 1, . . . 31) will now be considered. The local channel-number of the incoming timechannel will be designated by KN(i,j), which number depends both upon *i* and *j*.

The codewords originating from the incoming channel under consideration appear at the output of the synchronizer **203-*j* in the local channelintervals t having the number $KN_{(i,j)}$. These codewords are stored in the sector 204-*j*** of the switchingstore at the location having the address $KN_{(i,j)}$.

In order to obtain access to the outgoing multiplexline **200-*m* a subinterval $s_m$ has to be used at the supertimemultiplexline 205**. In order to obtain access to the $k^{th}$ outgoing timechannel the channelinterval $t_k^* = t_{k-1}$ has to be used at the supertimemultiplexline 205. The connecting-channel between the timechannels under consideration then has to use at the supertimemultiplexline 205 the subinterval $s_m.t_k^*$. In order to establish this connecting-channel the locationaddress PA = $KN_{(i,j)}$ and the sector address $SA_j$ are introduced at such a location of the store 800 that these addresses are supplied to the switching-store in the subintervals $s_m.t_{k-1}$. In each of these subintervals the storage location with the location address $KN_{(i,j)}$ of the sector **204-*j* of the switchingstore then is read out. Through the supertimemultiplexline 205 the codewords thus read are supplied to the demultiplexer 206, in which these codewords are stored in the parallel-series-converter 700-*m*. The latter transmits the codewords in serialform through the outgoing multiplexline 201-*m*** in the channelintervals $t_k$, that is to say in the $k^{th}$ timechannel.

It has so far been assumed that the local channelnumber $KN_{(i,j)}$ is a constant. In the manner described, a permanent connecting channel is maintained between the timechannels under consideration until the read address is erased. There will now be considered the case that $KN_{(i,j)}$ is not constant. It is supposed then that after the connectingchannel has been established in the manner described above the synchronizer **202-*j* produces a signal FA or a signal SL. By cyclically scanning the output terminals 521 and 522 of all synchronizers a central controlarrangement can detect the presence of a signal FA or a signal SL at a synchronizer. After the detection of the presence of a signal FA or a signal SL at the synchronizer 203-*j*** the central controlarrangement stops the detection of the presence of a signal FA or SL at other synchronizers. The central controlarrangement then proceeds to carry out the following operations:

a. Determination of the sector address $SA_j$, associated with the sector of the switchingstore, to which the synchronizer **203-*j*** is connected.

b. 1. Setting of the input terminal 820 of the addressing-arrangement of FIG. 8 in the logical state 1 (signal FA') at the detection of a signal FA or
2. Setting of an input terminal 821 of the addressing-arrangement of FIG. 8 in the logical state 1 (signal SL'), at the detection of a signal SL.

c. Supply of the sector address $SA_j$ to the group of inputterminals 824 of the addressingarrangement of FIG. 8 and the supply of a clockpulse to the input terminal 825 for storing the sectoraddress in register 805.

d. Application of a correctioninstruction to the input-terminal 523 of synchronizer **203-*j* of FIG. 5**.

The signal FA' indicates that the addresscounter 509 of synchronizer **203-*j* carries out a positive correction step and hence the transformed timescale includes an shortened interval. The signal SL' indicates that the addresscounter 509 of synchronizer 203-*j*** carries out a negative correction step and hence the transformed time scale includes a prolonged interval.

As a result of operation (d) the synchronizer **203-*j* applies a frame correctionsignal RC to the input-terminal 817 of the addressingarrangement. The signal RC actuates the multiple and-gate 816 for one addresscorrectionperiod of the duration of a local frame. In this addresscorrectionperiod the and-gate 816 passes the sector-addresses presented by register 802 to the comparator 804. The register 805, connected to the comparator 804, applies the sectoraddress $SA_j$ thereto. The comparator 804 is set in the logical outputstate 1 each time when the address supplied via the and-gate 816 is equal to the address supplied to the register 805 and is set in the logical state 0 when the addresses are unequal. When the central controlarrangement has set the input terminal 820 in the logical state 1 (signal FA'), the and-gate 818 is set in the logical output state 1, each time when the comparator 804 states equality. The and-gate 822 connected to the output of the and-gate 818 passes a clockpulse dcs each time when equality is stated. This clock pulse decreases by 1 the locationaddress stored in register 801. Thus the locationaddress corresponds to the local channelnumber of the relevant incoming timechannel, which number has been decreased by unity as a result of the appearance of a signal FA in synchronizer 203-*j*** and of the subsequent correctioninstruction.

In the other case in which the central control-arrangement has set the input terminal 821 in the logical state 1 (signal SL'), the and-gate 819 is set in the logical output state 1 so that the and-gate 823 passes a clockpulse dcs, each time when the comparator 804 states equality. This clockpulse dcs increases by unity the locationaddress stored in register 801. Thus this address is caused to correspond to the local channelnumber of the relevant incoming timechannel, which number has been increased by unity as a result of the signal SL in synchronizer **203-*j*** and the subsequent correction instruction.

In one addresscorrectionperiod all sectoraddresses stored in the store 800 are applied once to the comparator 804 so that after the termination of the addresscorrection-period all readaddresses including as a sectoraddress the address $SA_j$ match the new situation produced by the corection of the addresscounter 509.

The sequence of channelnumbers $KN_0$, $KN_1$, . . . $KN_{31}$ forms in some binary code the binary equivalent of the sequence of decimal numbers 0, 1, . . . 31. An increase of the channel number $KN_j$ ($j$ = 0, 1, . . . 31) by unity means an increase of the decimal equivalent $j$ by 1. For the binary codeword $KN_j$ this means a conversion into the codeword $KN_{(j+1) \bmod 32}$. In the same way a decrease by unity means for the codeword $KN_j$ a conversion into the codeword $KN_{(j-1) \bmod 32}$. The same applies to the location-addresses PA.

After in the addressingarrangement all location-addresses PA appearing in conjunction with the sector-address $SA_j$ have been changed by unity, the central control-arrangement can resume detection of the presence of a signal FA or SL at the synchronizers 203.

AS a result of the modification of the location-addresses all connectingchannels beginning at the incoming timechannels of the incoming timemultiplexline 200-$j$ are maintained. New connectingchannels are established by using locationaddresses corresponding to the local channelnumbers, which are derived from the channel number $KN_x$ stored in register 530. The last number is constantly adapted to the new situation produced by the correction of the address-counter 509 and therefore indicates the most recent local channelnumber of the incoming timechannel 31. The location-addresses thus derived are then automatically adapted to the new situation.

What is claimed is:

1. A telecommunication arrangement for receiving, storing and reading sequences of coded informations comprising a storage arrangement, a first addressing arrangement for writing in said storage arrangement, a second addressing arrangement for reading out of said storage arrangement, a receiving arrangement for receiving a sequence of coded informations having a time scale formed by equal receiving intervals, a local clock arrangement comprising a generator for generating a local time-scale having a plurality of equal local intervals of the same nominal duration as the receiving intervals, a transposition arrangement coupled to said receiver and said clock for transposing each received information from the receiving interval into an associated interval of a transformed time scale having normal intervals coinciding each with a local interval, shortened intervals having zero length and prolonged intervals each coinciding with two successive local intervals, said intervals of the transformed time scale being associated one to one to the receiving intervals, said storage arrangement further comprising an input arrangement coupled to the receiver for storing in each local interval the received coded information that is transposed to said each local interval in a sector of the storage arrangement that is associated with the said transposition arrangement, said storage location indicated in said each local interval by said first addressing arrangement, said first addressing arrangement including a cyclic address counter which generates an address in each local interval, and a signalling device for indicating a first state defined as the transformed time scale of the transposition arrangement comprising a shortened interval; and a second state defined as the transformed time scale of the transposition arrangement comprising a prolonged interval, and an address modification arrangement coupled to said second addressing arrangement and to said signalling device and responsive to said first state for decreasing and to said second state for increasing by unity the addresses of storage locations of said sector of the storage arrangement stored in said second addressing arrangement and associated with the transposition arrangement.

* * * * *